US010839522B2

(12) United States Patent
Potthast

(10) Patent No.: US 10,839,522 B2
(45) Date of Patent: Nov. 17, 2020

(54) ADAPTIVE DATA COLLECTING AND PROCESSING SYSTEM AND METHODS

(71) Applicant: Toyota Research Institute, Inc., Los Altos, CA (US)

(72) Inventor: Christian Potthast, Redwood City, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 134 days.

(21) Appl. No.: 15/977,707

(22) Filed: May 11, 2018

(65) Prior Publication Data

US 2019/0347805 A1   Nov. 14, 2019

(51) Int. Cl.
  *G06T 7/20*  (2017.01)
  *G06T 7/70*  (2017.01)
(52) U.S. Cl.
  CPC ................. *G06T 7/20* (2013.01); *G06T 7/70* (2017.01); *G06T 2207/30252* (2013.01)
(58) Field of Classification Search
  CPC .................. G06T 7/70; G06T 2207/30252
  See application file for complete search history.

(56) References Cited

U.S. PATENT DOCUMENTS

| 7,102,496 | B1 * | 9/2006 | Ernst, Jr. .......... G08G 1/096725 180/167 |
| 7,124,027 | B1 * | 10/2006 | Ernst, Jr. ............... B60W 30/09 701/301 |
| 8,670,590 | B2 * | 3/2014 | Uchida .................... G06T 7/269 382/103 |
| 9,517,767 | B1 * | 12/2016 | Kentley .................. B60R 21/01 |
| 9,598,088 | B2 | 3/2017 | Lee et al. |
| 9,658,243 | B2 | 5/2017 | Shirakata et al. |
| 9,767,372 | B2 * | 9/2017 | Yamanoi ................ G01C 21/30 |
| 9,818,237 | B2 | 11/2017 | Iyoda et al. |
| 9,939,817 | B1 * | 4/2018 | Kentley-Klay ........ B60N 2/002 |
| 10,246,089 | B2 * | 4/2019 | Sasabuchi .......... B60W 30/0953 |
| 2009/0135048 | A1 * | 5/2009 | Jordan .................... G01S 7/411 342/70 |

(Continued)

OTHER PUBLICATIONS

Jalled, Fares; Object detection using image processing; https://arxiv.org/pdf/1611.07791.pdf.

(Continued)

*Primary Examiner* — Kim Y Vu
*Assistant Examiner* — Molly Delaney
(74) *Attorney, Agent, or Firm* — Dinsmore & Shohl LLP

(57) ABSTRACT

A vehicle that includes one or more sensors configured to output data and an electronic control unit. The electronic control unit is configured to receive first data from the one or more sensors at a first time, detect an object based on the first data received from the one or more sensors at the first time, classify the object into a classification based on the first data received from the one or more sensors at the first time, and receive second data from the one or more sensors at a second time. The second time is subsequent to the first time. The electronic control unit is further configured to select a proper subset of the second data for further processing based on the classification of the object, and track the object based on the proper subset of the second data selected for further processing.

17 Claims, 7 Drawing Sheets

(56) References Cited

U.S. PATENT DOCUMENTS

| | | | | |
|---|---|---|---|---|
| 2010/0021011 | A1* | 1/2010 | Shida | B60R 1/00 |
| | | | | 382/104 |
| 2013/0063600 | A1* | 3/2013 | Pawlicki | B60W 30/18 |
| | | | | 348/148 |
| 2014/0379197 | A1* | 12/2014 | Eckert | B60T 7/22 |
| | | | | 701/28 |
| 2015/0293216 | A1* | 10/2015 | O'Dea | B60W 30/12 |
| | | | | 701/23 |
| 2016/0282874 | A1* | 9/2016 | Kurata | G05D 1/0289 |
| 2016/0347326 | A1* | 12/2016 | Iwagami | B60W 10/06 |
| 2017/0080862 | A1* | 3/2017 | Petrillo | B60R 1/00 |
| 2017/0361772 | A1 | 12/2017 | Pflug | |
| 2018/0082135 | A1* | 3/2018 | Crawford | B60R 11/04 |
| 2018/0240335 | A1* | 8/2018 | Dong | G08G 1/0112 |
| 2019/0057263 | A1* | 2/2019 | Miville | G01S 17/936 |
| 2019/0138029 | A1* | 5/2019 | Ryll | G05D 1/101 |
| 2019/0161274 | A1* | 5/2019 | Paschall, II | B65G 1/0492 |
| 2019/0162844 | A1* | 5/2019 | Tachibana | G01S 13/931 |
| 2019/0180502 | A1* | 6/2019 | England | G01S 7/40 |
| 2019/0197345 | A1* | 6/2019 | Sawada | G06T 7/00 |
| 2019/0333232 | A1* | 10/2019 | Vallespi-Gonzalez | |
| | | | | G06N 20/00 |

OTHER PUBLICATIONS

Zhao, Meiyuan; Advanced Driver Assistant System; https://www.intel.com/content/dam/www/public/us/en/documents/whitepapers/advanced-driverassistant-system-paper.pdf.

* cited by examiner

ADAPTIVE DATA COLLECTING AND PROCESSING SYSTEM AND METHODS

TECHNICAL FIELD

The present specification generally relates to adaptive data collecting and processing systems and methods for reducing the amount of data that must be processed by a sensing system and, more specifically, to adaptive data collecting and processing systems and methods for reducing the amount of data that must be processed by a mobile sensing system onboard a vehicle.

BACKGROUND

The number and types of sensing systems onboard a vehicle and the amount of data collected by each type of sensing system onboard the vehicle is increasing. It follows that the amount of data that must be processed by onboard computing systems is similarly increasing. Processing power onboard the vehicle may be limited. Accordingly, a need exists for adaptive data collecting and processing systems and methods.

SUMMARY

In one embodiment, a vehicle includes one or more sensors configured to output data and an electronic control unit. The electronic control unit is configured to receive first data from the one or more sensors at a first time, detect an object based on the first data received from the one or more sensors at the first time, classify the object into a classification based on the first data received from the one or more sensors at the first time, receive second data from the one or more sensors at a second time, wherein the second time is subsequent to the first time, select a proper subset of the second data for further processing based on the classification of the object, and track the object based on the proper subset of the second data selected for further processing.

In another embodiment, an electronic control unit is configured to receive first data from the one or more sensors at a first time, detect an object based on the first data received from the one or more sensors at the first time, classify the object into a classification based on the first data received from the one or more sensors at the first time, and receive second data from the one or more sensors at a second time. The second time is subsequent to the first time. The electronic control unit is further configured to select a proper subset of the second data for further processing based on the classification of the object, and track the object based on the proper subset of the second data selected for further processing.

In still another embodiment, a method of reducing the amount of data that must be processed by an electronic control unit of a vehicle includes receiving first data from one or more sensors communicatively coupled to the electronic control unit at a first time, detecting an object based on the first data received from the one or more sensors at the first time, classifying the object into a classification based on the first data received from the one or more sensors at the first time, receiving second data from the one or more sensors at a second time, wherein the second time is subsequent to the first time, selecting a proper subset of the second data for further processing based on the classification of the object, and tracking the object based on the proper subset of the second data selected for further processing.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
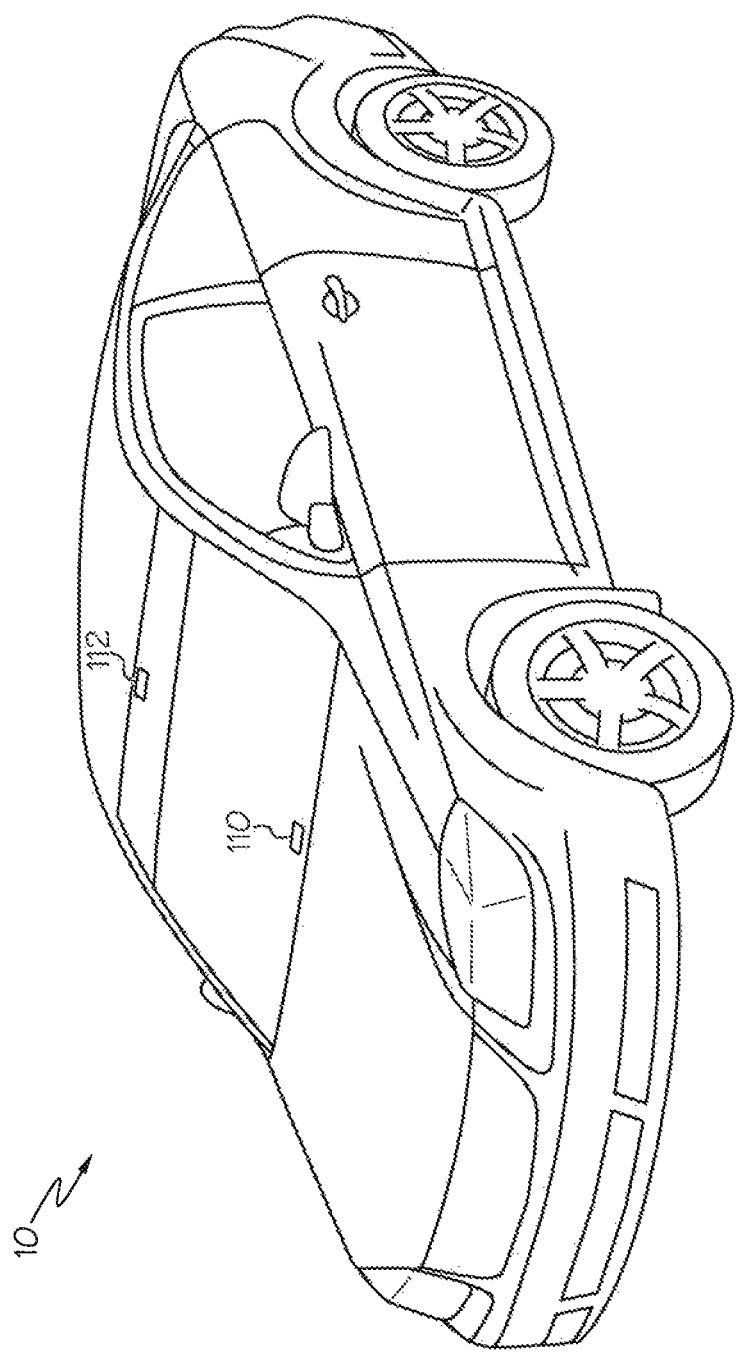
FIG. 1 depicts a vehicle having one or more externally facing sensors configured for adaptive data collection and processing, according to one or more embodiments shown and described herein.

Current vehicles may include one or more sensors that sense objects or characteristics of the internal and external environment of the vehicle. These sensors may be coupled to a processor to classify and track the objects and/or perform dynamic scene analysis or to make one or more autonomous or semi-autonomous decisions based on a classification, a motion profile, and/or other characteristics of the object. Myriad challenges with object classification in a dynamic environment exist, particularly in the case of fused sensor data from multiple types of sensors. Driving environments especially may pose particularly challenging problems with classifying external objects as the sensor system will be subject to constant changes in viewpoint and illumination, object deformation and occlusion, background clutter, and high levels of interclass variation. However, in many instances, the objects and background in a roadway environment may naturally tend toward well-segmented data, for example, as drivers and/or vehicles maintain comfortable distances from other drivers and other objects in the road. Additionally, pre-existing features of the road that signal directions and rules to a driver may also generally be used by an onboard sensor system or systems.

However, while a driving environment may tend toward a more easily segmented object environment than some other environments, the quantity of data encountered in the driving environment poses particular challenges. While already high due to the dynamic nature of the driving environment, the amount of data that must be processed is continuously increasing due to the increase in the number, type, and resolution of onboard sensors in an effort to make the systems more robust. Moreover, while data capture capabilities may be increasing rapidly, increases in processing speed may be relatively stagnant, especially with respect to processing data local to the vehicle.

Computing capability onboard the vehicle may be relatively limited. Some vehicles may use general-purpose graphics processing units ("GPGPU") to process data from the sensors. GPGPUs are graphic processing units used for general purpose computing. GPGPUs may have characteristics that make them desirable for processing large amounts of data, such as that data coming from the multiple sensors on the vehicle. While GPGPUs may increase computing performance onboard the vehicle, the number of sensors and amount of data received by each may be increasing faster than the increasing processing rates can increase. While some potential exists for external processing, local processing of data may be desirable for a variety of reasons. For instance, the data transfer connection established between the vehicle and an external computer may limit the rate of data processing. As another example, it may be impossible for the vehicle to establish a data transfer connection with an external computer in remote areas.

So while data collection and data collection rates increase, processing speed may be relatively limited. Accordingly, new techniques for data processing may be desirable. The current techniques used to detect, classify, and track objects may process all data points collected by the sensors. This may result in unnecessary data processing and unnecessarily sacrifice computational power. It might be possible to reduce processing requirements by filtering some unnecessary data. An adaptive data collecting and processing system and methods for using the system is required.

Referring now to FIG. 1, an example vehicle 10 including multiple sensor systems is shown. The particular example embodiment of the vehicle 10 includes at least one external environment camera 110 and a LIDAR system 112, however, embodiments are not limited to this configuration. It is contemplated that other embodiments of the vehicle 10 may include various other sensing systems, such as, for example, a radar system, a sonar system, a temperature sensing system and/or a weather or moisture sensing system. Additionally, the particular example embodiment of the vehicle 10 shows the at least one external environment camera 110 and the LIDAR system 112 facing forward of the vehicle 10. However, embodiments are not limited to this configuration and the sensing coverage is not limited to any particular arc of coverage surrounding the vehicle 10. It is contemplated that the various sensors of the vehicle 10 may provide 360 degrees of coverage to sense the external environment.

The particular embodiment depicted in FIG. 1 illustrates the vehicle 10 as a coupe but embodiments are not so limited. It is contemplated that the vehicle 10 may be any type of vehicle such as a sedan, a truck, an SUV, a van, etc. Additionally, embodiments are not limited to the particular arrangement of sensors shown in FIG. 1. It is contemplated that the vehicle 10 may comprise one or more of each of the various types of sensors shown in FIG. 1 or that the vehicle 10 may comprise other types of external sensors now known or yet to be developed.

Figure 2:
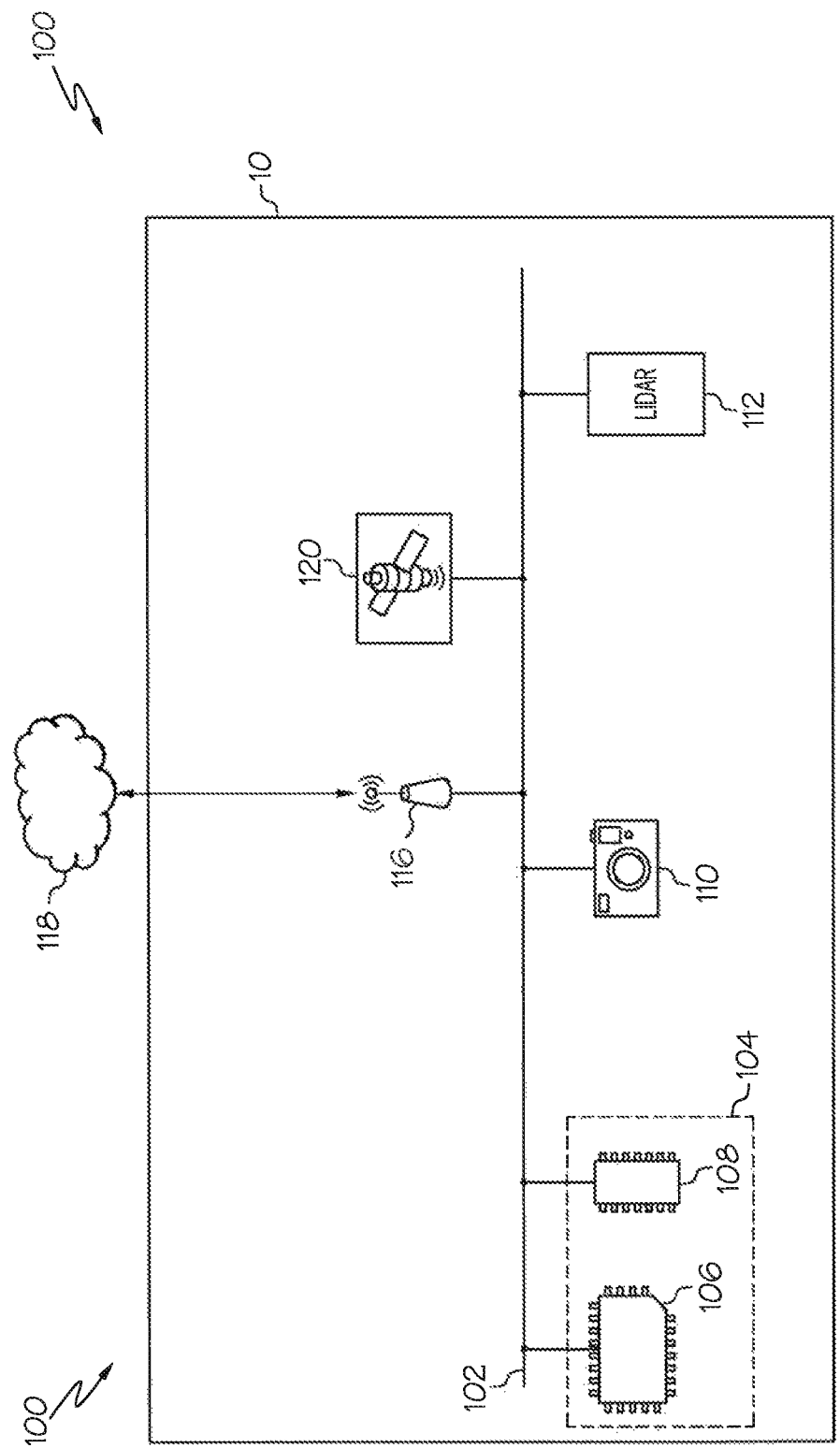
FIG. 2 depicts a schematic view of systems and features of the vehicle of FIG. 1, according to one or more embodiments shown and described herein.

Turning now to FIG. 2, an adaptive data collection and processing system 100 of the vehicle 10 generally includes a communication path 102, an electronic control unit (ECU) 104 including a processor 106 and a non-transitory computer readable memory 108, the at least one external environment camera 110, the LIDAR system 112, and network interface hardware 116. The vehicle 10 may be coupled to a network 118 by the network interface hardware 116. The adaptive data collection and processing system 100 may also generally include a GPS 120. The components of the adaptive data collection and processing system 100 may be contained within or mounted to the vehicle 10. The various components of the adaptive data collection and processing system 100 and the interaction thereof will be described in detail below.

The communication path 102 may be formed from any medium that is capable of transmitting a signal such as, for example, conductive wires, conductive traces, optical waveguides, or the like. The communication path 102 may also refer to the expanse in which electromagnetic radiation and their corresponding electromagnetic waves traverses. Moreover, the communication path 102 may be formed from a combination of mediums capable of transmitting signals. In one embodiment, the communication path 102 comprises a combination of conductive traces, conductive wires, connectors, and buses that cooperate to permit the transmission of electrical data signals to components such as processors, memories, sensors, input devices, output devices, and communication devices. Accordingly, the communication path 102 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 102 communicatively couples the various components of the adaptive data collection and processing system 100. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 104 may be any device or combination of components comprising a processor, such as the processor 106, and a memory, such as the non-transitory computer readable memory 108. The processor 106 of the adaptive data collection and processing system 100 may be any device capable of executing the machine-readable instruction set stored in the non-transitory computer readable memory 108 or in the network 118. Accordingly, the processor 106 may be an electric controller, an integrated circuit, a microchip, a computer, or any other computing device. The processor 106 is communicatively coupled to the other components of the adaptive data collection and processing system 100 by the communication path 102. Accordingly, the communication path 102 may communicatively couple any number of processors 106 with one another, and allow the components coupled to the communication path 102 to operate in a distributed computing environment. Specifically, each of the components may operate as a node that may send and/or receive data. While the embodiment depicted in FIG. 2 includes a single processor, that is, the processor 106, other embodiments may include more than one processor.

The non-transitory computer readable memory 108 of the adaptive data collection and processing system 100 is coupled to the communication path 102 and communicatively coupled to the processor 106. The non-transitory computer readable memory 108 may comprise RAM, ROM, flash memories, hard drives, or any non-transitory memory device capable of storing machine-readable instructions such that the machine-readable instructions can be accessed and executed by the processor 106. The machine-readable instruction set may comprise logic or algorithm(s) written in any programming language of any generation (e.g., 1GL, 2GL, 3GL, 4GL, or 5GL) such as, for example, machine language that may be directly executed by the processor 106, or assembly language, object-oriented programming (OOP), scripting languages, microcode, etc., that may be compiled or assembled into machine readable instructions and stored in the non-transitory computer readable memory 108. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory computer readable memory, other embodiments may include more than one non-transitory computer readable memory.

Still referring to FIG. 2, the at least one external environment camera 110 is coupled to the communication path 102 and communicatively coupled to the electronic control unit 104 and consequently the processor 106. The at least one external environment camera 110 may be any device having an array of sensing devices (e.g., pixels) capable of detecting radiation in an ultraviolet wavelength band, a visible light wavelength band, or an infrared wavelength band. The at least one external environment camera 110 may include or be associated with a night vision system or low light system. The at least one external environment camera 110 may have any resolution; however, high resolution may provide for enhanced light and object identification and detection. The at least one external environment camera 110 may be an omni-directional camera, or a panoramic camera. In some embodiments, one or more optical components, such as a mirror, fish-eye lens, or any other type of lens may be optically coupled to each of the at least one external environment camera 110. The at least one external environment camera 110 may be positioned within or on the vehicle 10 to view the environment external to the vehicle 10. For example, without limitation, at least one external environment camera 110 may be positioned on the dashboard of the vehicle 10 to capture images of the surroundings in front of the vehicle 10 during operation. The position of the at least one external environment camera 110 is not limited to the dashboard of the vehicle 10. The at least one external environment camera 110 may be positioned anywhere on or within the vehicle 10 to capture images of surroundings of the vehicle 10 during operation.

The at least one external environment camera 110 captures images of the surroundings of the vehicle and generates image data that is communicated to the electronic control unit 104 and the processor 106. The processor 106 may employ one or more object recognition algorithms to the image data to extract objects and features. Any known or yet-to-be-developed object recognition algorithms or facial recognition algorithms may be used to extract the objects and features from the image data. Example object recognition algorithms or facial recognition algorithms include, but are not limited to, scale-invariant feature transform ("SIFT"), speeded up robust features ("SURF"), and edge-detection algorithms. The object recognition algorithms or facial recognition algorithms may be stored in the non-transitory computer readable memory 108 or in the network 118 and executed by the processor 106.

Still referring to FIG. 2, a global positioning system, such as the GPS 120, may be coupled to the communication path 102 and communicatively coupled to the electronic control unit 104. The GPS 120 is capable of generating location information indicative of a location of the vehicle 10 by receiving one or more GPS signals from one or more GPS satellites. The GPS signal communicated to the electronic control unit 104 via the communication path 102 may include location information comprising a National Marine Electronics Association (NMEA) message, latitude and longitude data set, a street address, a name of a known location based on a location database, or the like. Additionally, the GPS 120 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

In some embodiments, the one or more external vehicle environment sensors may include the LIDAR system 112. The LIDAR system 112 is communicatively coupled to the communication path 102 and the electronic control unit 104. The LIDAR system 112, or light detection and ranging system, uses pulsed laser light to measure distances from the LIDAR system 112 to objects that reflect the pulsed laser light. The LIDAR system 112 may be made of solid-state devices with few or no moving parts, including those configured as optical phased array devices where its prism-like operation permits a wide field-of-view without the weight and size complexities associated with a traditional rotating LIDAR system. The LIDAR system 112 is particularly suited to measuring time-of-flight, which in turn can be correlated to distance measurements with objects that are within a field-of-view of the LIDAR system 112. By calculating the difference in return time of the various wavelengths of the pulsed laser light emitted by the LIDAR system 112 a digital 3-D representation of a target or environment may be generated. The pulsed laser light emitted by the LIDAR system 112 may in one form be operated in or near the infrared range of the electromagnetic spectrum, with one example having emitted radiation of about 905 nanometers. Sensors such as the LIDAR system 112 can be used by vehicle 10 to provide detailed 3-D spatial information for the identification of objects near the vehicle 10, as well as the use of such information in the service of systems for vehicular mapping, navigation and autonomous operations, especially when used in conjunction with geo-referencing devices such as GPS 120 or a gyroscope-based inertial navigation unit (INU, not shown) or related dead-reckoning system, as well as the non-transitory computer readable memory 108 (either its own or memory of the electronic control unit 104).

In some embodiments, the LIDAR system 112 may be interpolated with the image data from the at least one external environment camera 110 to generate or refine a simulated model of the vehicle environment. In embodiments, the simulated model may be independently generated from the image data. Additionally, other sensor systems and mapping systems such as radar, inertial measurement units (IMU) and the like may be implemented to provide additional data to the electronic control unit 104 for processing image data to determine objects and sources of light in the environment of the vehicle 10.

The network interface hardware 116 is coupled to the communication path 102 and communicatively coupled to the electronic control unit 104. The network interface hardware 116 may be any device capable of transmitting and/or receiving data via a network 118. Accordingly, network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 116 includes hardware configured to operate in accordance with the Bluetooth wireless communication protocol. In another embodiment, the network interface hardware 116 may include a Bluetooth send/receive module for sending and receiving Bluetooth communications to/from a network 118. The network interface hardware 116 may also include a radio frequency identification ("RFID") reader configured to interrogate and read RFID tags.

In some embodiments, the adaptive data collection and processing system 100 may be communicatively coupled to nearby vehicles via the network 118. In some embodiments, the network 118 is a personal area network that utilizes Bluetooth technology to communicatively couple the adaptive data collection and processing system 100 and the nearby vehicles. In other embodiments, the network 118 may include one or more computer networks (e.g., a personal area network, a local area network, or a wide area network), cellular networks, satellite networks and/or a global positioning system and combinations thereof. Accordingly, the adaptive data collection and processing system 100 can be communicatively coupled to the network 118 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Figure 5:
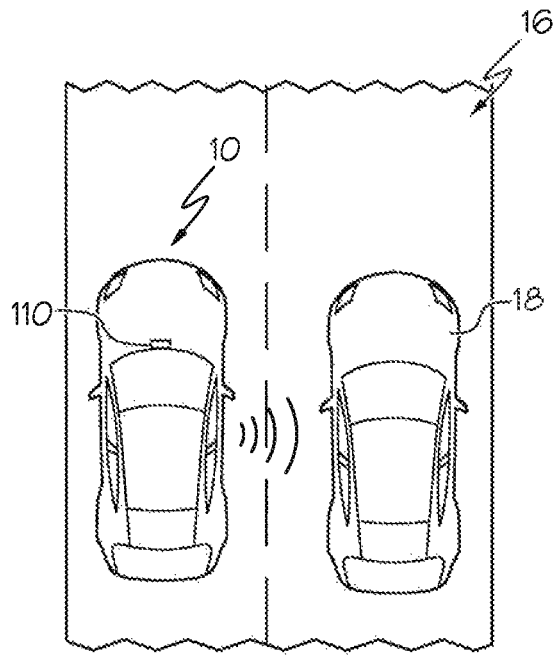
FIG. 5 depicts a second example scenario in which the method of FIG. 3 might be implemented, according to one or more embodiments shown and described herein.

Still referring to FIG. 2, as stated above, the network 118 may be utilized to communicatively couple the adaptive data collection and processing system 100 with nearby vehicles (such as the second vehicle 18 depicted in FIG. 5). The nearby vehicles may include network interface hardware and an electronic control unit having a processor and non-transitory computer readable memory capable of being communicatively coupled with the adaptive data collection and processing system 100 of the vehicle 10. A processor of the nearby vehicle or vehicles may execute a machine-readable instruction set stored in a non-transitory computer readable memory or in another network to communicate with the adaptive data collection and processing system 100.

The following sections will now describe embodiments of the operation of the adaptive data collection and processing system 100. Although embodiments disclosed herein refer to the processing of visual data, the embodied systems and methods may also be applied to LIDAR data, radar data, sonar data, or any other type of data collected from the external environment of the vehicle 10. For example, an external object may be detected by one or more of the at least one external environment camera 110, the LIDAR system 112, or another externally facing sensor of the vehicle 10. In embodiments of the adaptive data collection and processing system 100, the system comprises an electronic control unit 104 having a processor 106 and a non-transitory computer readable memory 108, at least one external environment camera 110, a GPS 120, and a LIDAR system 112 communicatively coupled to the electronic control unit 104. In some embodiments, the adaptive data collection and processing system 100 includes additional sensors and systems as described herein.

Figure 3:
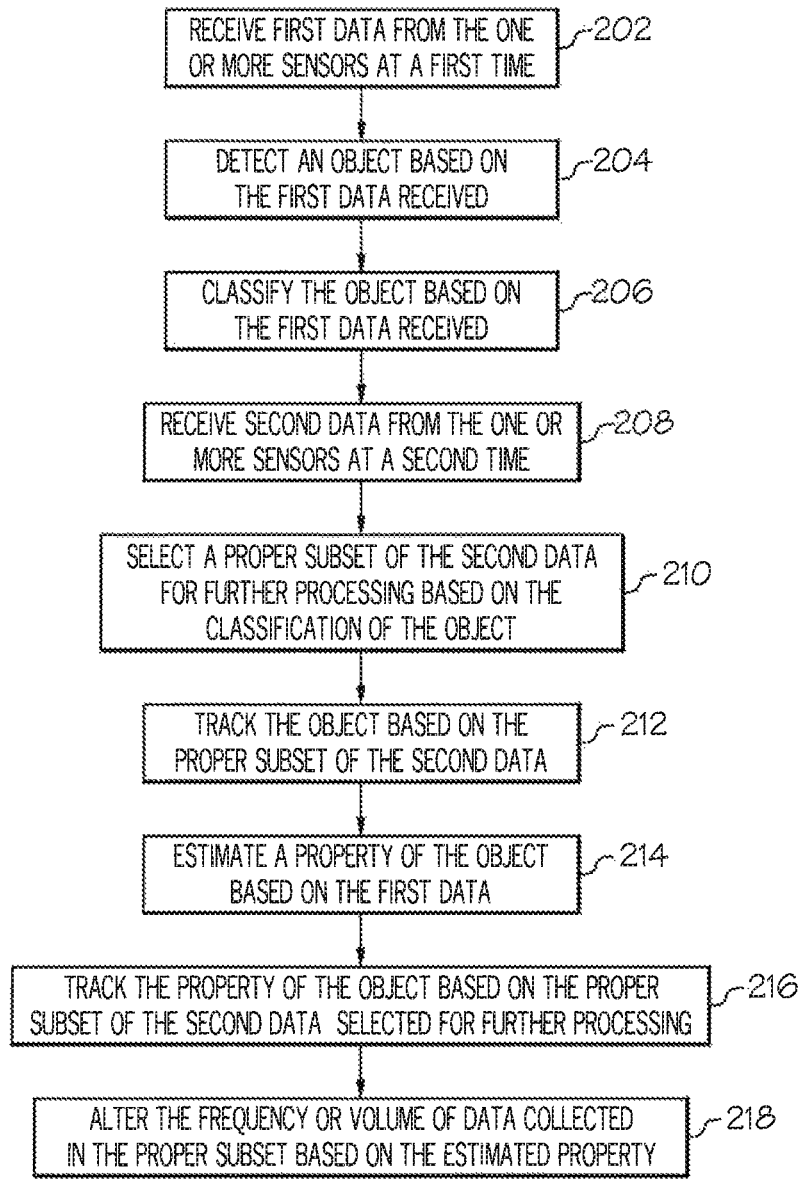
FIG. 3 depicts a flow chart showing an example process for adaptive data collection and processing, according to one or more embodiments shown and described herein.

Referring to FIG. 3, an example process 200 for adaptive data processing and classification is shown. At step 202, the adaptive data collection and processing system 100 may receive first data from the one or more sensors at a first time. For example, the data may be received from the at least one external environment camera 110 and/or the LIDAR system 112. Once the first data is received, an object may be detected based on the first data received from the one or more sensors at step 204, such as using any of the objection recognition algorithms described above.

At step 206, the adaptive data collection and processing system 100 may classify the object into a classification based on the first data received from the one or more sensors. To classify the external object, the adaptive data collection and processing system 100 may apply one or more visual object recognition algorithms to the image data to extract and classify objects and features of the objects. Any known or yet-to-be-developed object recognition algorithms may be used to extract the objects and features from the image data. Example object recognition algorithms or facial recognition algorithms include, but are not limited to, scale-invariant feature transform ("SIFT"), speeded up robust features ("SURF"), and edge-detection algorithms. The adaptive data collection and processing system 100 may use object recognition algorithms stored in the non-transitory computer readable memory 108 or retrieved from the network 118 and executed by the processor 106.

In some embodiments, the classification of an object may include partitioning of image data into one or more segments based on a classification of the individual pixels in the image data. One or more image segmentation algorithms may be stored in the non-transitory computer readable memory 108 and applied to the image data generated by the at least one external environment camera 110. Example segmentation algorithms include, but are not limited to, thresholding algorithms, clustering algorithms, edge-detection algorithms, region-growing algorithms, and dual clustering algorithms.

The adaptive data collection and processing system 100 may receive second data from the one or more sensors at a second time that is subsequent to the first time at step 208. The adaptive data collection and processing system 100 may then select a proper subset of the second data for further processing based on the classification of the object at step 210. As used herein, the term "proper subset" refers to a subset of an original set of data that contains only data of the original set of data but that does not contain all of the original data of the original set of data. For example, B is a proper subset of A if all of B are in A, but A contains at least one element that is not in B.

Once the proper subset of data is selected at step 210, the adaptive data collection and processing system 100 may track the object based on the proper subset of the second data at step 212. The use of the proper subset of the second data necessarily reduces the amount of data processed to track the object because as described above, the proper subset necessarily contains less data than the original set of first data received at step 202.

Still referring to FIG. 3, in some embodiments, the adaptive data collection and processing system 100 may be configured to estimate a property of the object based on the first data at step 214 and to track the property of the object based on the proper subset of the second data selected for further processing at step 216. In some embodiments, the property of the object comprises at least one of a size, a direction of motion, and a speed of motion. In some embodiments, the adaptive data collection and processing system 100 may be configured further to alter the frequency and/or volume of data collected in the proper subset based on the estimate property or properties at step 218.

Figure 4:
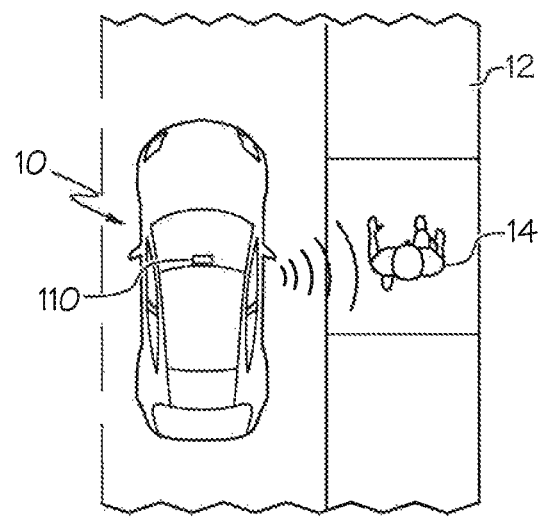
FIG. 4 depicts an example scenario in which the method of FIG. 3 might be implemented, according to one or more embodiments shown and described herein.

Referring now to FIGS. 4 and 5, an example process for using the adaptive data collection and processing system 100 will be described in detail. In FIG. 4, a first example scenario depicts the vehicle 10 driving beside a sidewalk 12. The adaptive data collection and processing system 100 may detect an external object on the sidewalk using one of the externally facing sensors of the vehicle 10. The vehicle 10 may detect the external object using the at least one external environment camera 110, for example. In the example shown in FIG. 4, the external object is a person 14.

The adaptive data collection and processing system 100 receives first data at a first time from the at least one external environment camera 110. At this point, the adaptive data collection and processing system 100 has not classified the person 14 as a person. The adaptive data collection and processing system 100 may use the data received from the one or more sensors at the first time to detect the external object and may use one or more object recognition or classification algorithms as described above to classify the external object. In this case, the adaptive data collection and processing system 100 classifies the external object as the person 14.

Second data may be received at a time subsequent to the first time. For example, as both the person 14 and the vehicle 10 continue to move forward, second data may be received by the one or more sensors of the vehicle 10. The adaptive data collection and processing system 100 may select a proper subset from the second data for further processing based on the classification of the object. In this case, the proper subset of the second data may include properties that need to be tracked for a person, for example, velocity and distance. The proper subset may not include properties that can be easily estimated with respect to a person. Data that may not be tracked in the proper subset may include, for example, an acceleration, a size, an elevation, a color, etc. These properties may be unnecessary to the proper operation of the vehicle 10 in vicinity of the person 14, and therefore, while capable of being detected, recorded, and/or processed, it may be unnecessary to process such data. Reducing the tracked data to a proper subset reduces the amount of data that must be processed to accurately track an object after it has been detected and classified and thus reduces the total amount of data that must be processed by the onboard or remote data processing systems, for example an electronic control unit or a GPGPU.

In some embodiments, whether data is tracked or not may be dependent on properties of the vehicle 10 itself. For example, in some embodiments, if the difference in velocity between the vehicle 10 and the person 14 is high (e.g., above 20 mph) the velocity and/or acceleration of the person 14 may be relatively inconsequential to the operation of the vehicle 10. That is, the vehicle 10 may pass the person 14 before the person 14 can make any movement that would matter to the vehicle 10. However, in some scenarios, such as in a neighborhood where children are playing on a sidewalk, the vehicle 10 may be travelling slowly relative to the maximum speed of people in the vicinity of the vehicle 10. Accordingly, it may be necessary to track the velocity and/or acceleration of the people.

In some other embodiments, once an object such as the person 14 is classified as such, properties associated with an object of that type may be estimated and these estimated properties may be used to further reduce the amount of data that is collected and/or processed to track the object. For example, the velocity or acceleration of a typical person walking down the sidewalk may be estimated. These estimated properties may be compared to the measured properties of the person 14. For example, it may be estimated that a typical person walks down a sidewalk at 4 miles per hour ("mph"). The measured value of the velocity of the person 14 walking down the sidewalk may be 4 mph. In this case, the estimated value may align with the measured value. In such a case, the adaptive data collection and processing system 100 may replace the measured value of the velocity of the person 14 with the estimated value, which is constant. In this way, the adaptive data collection and processing system 100 may alter the frequency or volume of data collected in the proper subset of data. For example, the adaptive data collection and processing system 100 may cease to collect data related to the velocity of the person 14 and substitute that data with the estimated value, reducing the need for data collection and processing. Alternatively, the adaptive data collection and processing system 100 may simply stop to record the velocity data of the person 14 and not replace the measured velocity with an estimated velocity. In such a case, the adaptive data collection and processing system 100 simply does not track an estimated or measured velocity of the person 14, reducing the amount of data collected and processed by the adaptive data collection and processing system 100.

Referring to FIG. 5, a second example scenario depicts the vehicle 10 driving on a two-lane roadway 16. The vehicle 10 may detect an external object to its right using one or more of the onboard externally facing sensors. In the particular example embodiment shown in FIG. 5, the vehicle 10 may detect the external object using the at least one external environment camera 110, for example. In this case, the external object is a second vehicle 18. The vehicle 10 receives first data from the at least one external environment camera 110 at a first time. From the first data, adaptive data collection and processing system 100 aboard the vehicle 10 may detect the external object. The adaptive data collection and processing system 100 aboard the vehicle 10 may then classify the object as the second vehicle 18.

Once the second vehicle 18 is classified, the adaptive data collection and processing system 100 may receive second data from the at least one external environment camera 110. A proper subset of the second data may be selected for further processing based on the classification of the object as the second vehicle. For example, the proper subset of the second data may include a velocity, a direction, and an acceleration of the second vehicle 18. Data that may not be tracked in the proper subset may include, for example, a size, an elevation, a color, etc. These properties may be unnecessary to the proper operation of the vehicle 10 in vicinity of the second vehicle 18, and therefore, while capable of being detected, recorded, and/or processed, it may be unnecessary to process such data.

In some embodiments, properties associated with the second vehicle 18 are estimated based on typical properties of other vehicles, which may allow the alteration of the frequency and/or volume of data collected from the second vehicle to be altered. Roadway environments, especially highways, where rules of the road and typical procedures are often followed strictly may lend themselves to the reduction of data collection. For example, the velocity or acceleration of a typical second vehicle driving down a roadway may be estimated or banded based on the speed limit or other road conditions or attributes. The estimated properties associated with a typical vehicle may be compared to the measured properties of the second vehicle 18. For example, it may be estimated that a typical second vehicle drives along a roadway at 55 mph. The measured value of the velocity of the second vehicle 18 driving along the roadway may be 55 mph such that the estimated value aligns with the measured value. In such a case, the adaptive data collection and processing system 100 may replace the measured value of the velocity of the second vehicle 18 with an estimated value, which is constant. In this way, the adaptive data collection and processing system 100 can alter the data collection frequency and/or volume related to the velocity of the second vehicle 18 and substitute that data with the estimated value, reducing the need for data collection and processing. Alternatively, in some embodiments, the adaptive data collection and processing system 100 may reduce the data collection frequency and/or volume to zero (i.e., simply stop recording the velocity data of the second vehicle 18) and not replace the measured velocity with an estimated velocity.

Referring to both FIGS. 4 and 5, there are differences between the dynamic properties of a person and a second vehicle in relation to a vehicle. For example, the maximum possible change in velocity for the person 14 relative to the vehicle 10 is relatively small. A person travelling on foot may be limited to approximately 20 mph and a walking person may be limited to even less, approximately 5 mph. In contrast, a second vehicle may display a broader range of possible velocities. For example, a second vehicle on a roadway may have a realistic velocity range of anywhere between 0 and 100 mph. This range is much greater than the velocity range of the person. Accordingly, the adaptive data collection and processing system 100 may use different ranges of values for comparing the estimated properties to the measured properties when deciding whether to continue to measure the velocities of person and the second vehicle or to replace the measured value with an estimated value or to stop performing any manipulation with velocity data in general.

Referring back to FIG. 4, a third example scenario using the person 14 will be described. In this scenario, the vehicle 10 has already detected and classified the external object as the person 14. Once the person 14 is detected and classified, estimated properties associated with a person may be assigned. In the case of a person walking along a sidewalk, it is unlikely that an acceleration value will have an appreciable difference with regard to the velocity of the vehicle 10. That is, the maximum potential acceleration of a person is small such that it is nearly impossible that a person could quickly match the velocity of a vehicle such as the vehicle 10. Accordingly, although there is in fact some acceleration value associated with the person 14 and that acceleration value is trackable by the one or more onboard sensors of the vehicle 10, an accurate estimation of the properties of the motion of the person 14 can be generated if the acceleration is assumed to be zero in comparison to the properties of the motion of the vehicle 10. Hence, some processing capability can be spared if the actual value of acceleration of the person 14 is not tracked and is instead replaced with an estimated value or the acceleration of the person 14 is simply disregarded from all processing purposes. However, the motion of the second vehicle 18 depicted in FIG. 5 is not similarly limited.

Referring to FIG. 5, a fourth example scenario using the second vehicle 18 will be described. In this scenario, the vehicle 10 has already detected and classified the external object as the second vehicle 18. Once the second vehicle 18 is detected and classified, estimated properties associated with a second vehicle may be assigned. Unlike the third scenario, in this scenario the external object may have an appreciable capability for acceleration. The second vehicle 18 has velocity and acceleration properties that are similar to the vehicle 10. That is, the second vehicle 18 could speed up or slow down appreciably with respect to the vehicle 10. Accordingly, it may be desirable to continue to measure the acceleration value of the second vehicle 18 with respect to the vehicle 10. Hence, some processing capability will be expended to continue to measure the acceleration of the second vehicle 18.

Figure 6:
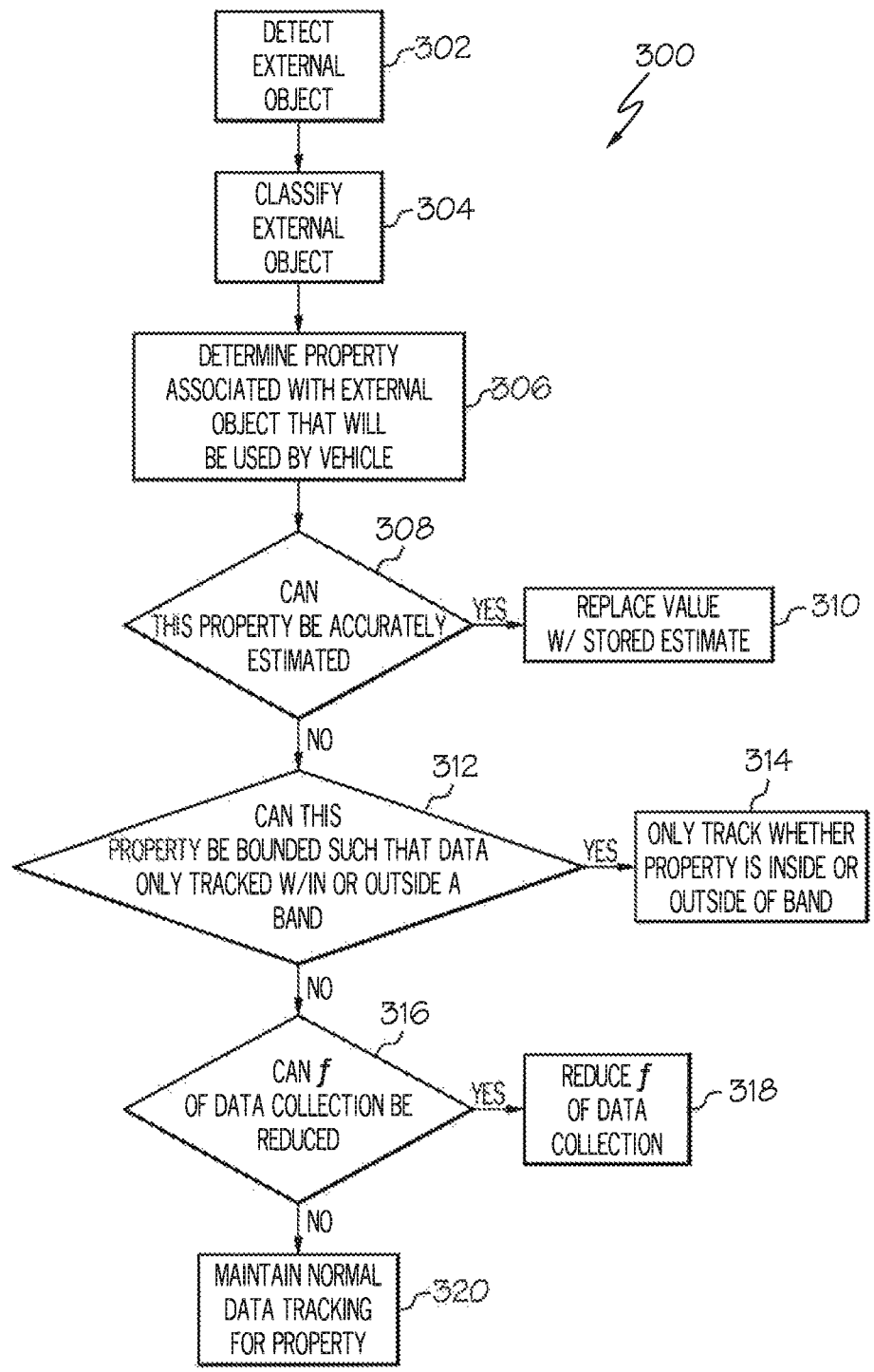
FIG. 6 depicts a flow chart showing an example process for adaptive data collection and processing, according to one or more embodiments shown and described herein.

Referring to FIG. 6, a flowchart depicting a process 300 for determining whether or not to continue tracking data associated with a property of an external object is shown. At step 302, the external object is detected and at step 304 the external object is classified. To classify the external object at step 304, the adaptive data collection and processing system 100 may apply one or more visual object recognition algorithms to the image data to extract and classify objects and features of the objects. Any known or yet-to-be-developed object recognition algorithms may be used to extract the objects and features from the image data. Example object recognition algorithms or facial recognition algorithms include, but are not limited to, scale-invariant feature transform ("SIFT"), speeded up robust features ("SURF"), and edge-detection algorithms. The adaptive data collection and processing system 100 may use object recognition algorithms stored in the non-transitory computer readable memory 108 or retrieved from the network 118 and executed by the processor 106.

At step 306, the adaptive data collection and processing system 100 may determine a property associated with external objects that will be used by the vehicle 10 to track the external object. For example, the vehicle 10 may determine that one or more of the following non-limiting examples may be used: a size, a color, a height, an elevation, a position, a velocity, and/or an acceleration of the external object. The external sensors of the vehicle 10 may continue to track selected properties of the external object. For example, the adaptive data collection and processing system 100 may track the position, velocity, and/or acceleration of the external object. Additionally, it may be possible to reduce the amount of data associated with these three example properties even though they will continue to be tracked.

At step 308, the adaptive data collection and processing system 100 may determine whether the value of a particular property can be estimated accurately. This determination may be made based on a number of factors, such as, but not limited to, the classification of the external object, the range of possible values for the particular classification of external object, and various parameters of the vehicle 10 itself. If the value of the property can be accurately estimated (i.e., "yes" at step 308), the adaptive data collection and processing system 100 may substitute a stored estimate or generate an estimate for the value of the particular property at step 310. For example, if it is determined that the speed of a another vehicle can be accurately estimated (i.e., "yes" at step 308), the adaptive data collection and processing system 100 may replace the measured speed value with an estimated value and cease processing data associated with the measured speed value at step 310.

If it is determined that the value cannot be accurately estimated (i.e., "no" at step 308), the adaptive data collection and processing system 100 may determine whether the property can be bounded such that data associated with the property is only tracked if it is inside or outside of a particular boundary or band at step 312. For example, the velocity of another vehicle may only need be tracked if it is outside of a 10 mph band that bounds the speed of the detecting vehicle.

For example, if a vehicle (such as the vehicle 10 of FIG. 7) is travelling 55 mph, it may only be necessary to track the speeds of other vehicles going slower than 50 mph or faster than 60 mph. That is, in some cases, the properties of external objects in the environment to be tracked may be determined by comparison to the current properties of the detecting vehicle. In such a case, the adaptive data collection and processing system 100 may process the data only if it is outside or inside of the band.

If the value of a property can be accurately bounded (i.e., "yes" at step 312), the property may only be tracked to determine whether it is inside or outside of a band at step 314. Referring to the example in FIG. 7, each of the other vehicles 30 already travelling on the highway 22 may be travelling within a band between 50 mph and 60 mph. The vehicle 10 may reach 55 mph before merging into the right lane 28 of the highway 22. Because the vehicle 10 is travelling at a relatively similar speed to the other vehicles 30, the vehicle 10 may determine that it only needs to track the speed of the vehicles within the ten (10) mph band around 55 mph. Accordingly, the vehicle 10 may continue to only track the speed of the other vehicles 30 inside or outside the ten (10) mph band.

If the value of the property cannot be accurately or usefully bounded (i.e., "no" at step 312), the adaptive data collection and processing system 100 may take some other step with regard to collecting and processing external data. For example, the adaptive data collection and processing system 100 may determine whether a frequency of data collection on the external object can be reduced at step 316. The adaptive data collection and processing system 100 may determine whether or not to reduce the frequency of data collection associated with a particular external object. For example, it may be necessary to collect velocity or acceleration data for a second vehicle once every data cycle. As used herein, a data cycle is the smallest unit of frequency at which a particular sensor can receive data on any given sensed external object. However, in some cases, the frequency of data collection may be reduced such that data is only collected for a given external object, for example, every second, third, fourth, (etc.) cycle.

If it is determined that the frequency of data collection and/or processing can be reduced for a particular property (i.e., "yes" at step 316), the frequency of data collection and/or processing may be reduced for that property at step 318. If it is determined that the frequency of data collection and/or processing for a particular property cannot be reduced (i.e., "no" at step 316), the adaptive data collection and processing system 100 may continue to track data for that particular property at the normal frequency at step 320.

Referring again to FIG. 4, an example scenario in which a particular property of an external object can be accurately estimated is depicted. As shown in FIG. 4, the vehicle 10 detects an external object using the at least one external environment camera 110 and classifies that external object as a person 14. The adaptive data collection and processing system 100 may determine a velocity of the person 14 will be used by the vehicle 10. The velocity of the person 14 may be used by the vehicle 10, for example, to automatically slow the vehicle to an acceptable level given the proximity of people to the vehicle 10. Based on the measured velocity of the person 14 and other factors, the adaptive data collection system 100 may determine that an estimated velocity value of the person 14 may suffice and replace the measured velocity with the estimated velocity and subsequently cease collecting and/or processing data associated with the measured velocity of the person 14.

Figure 7:
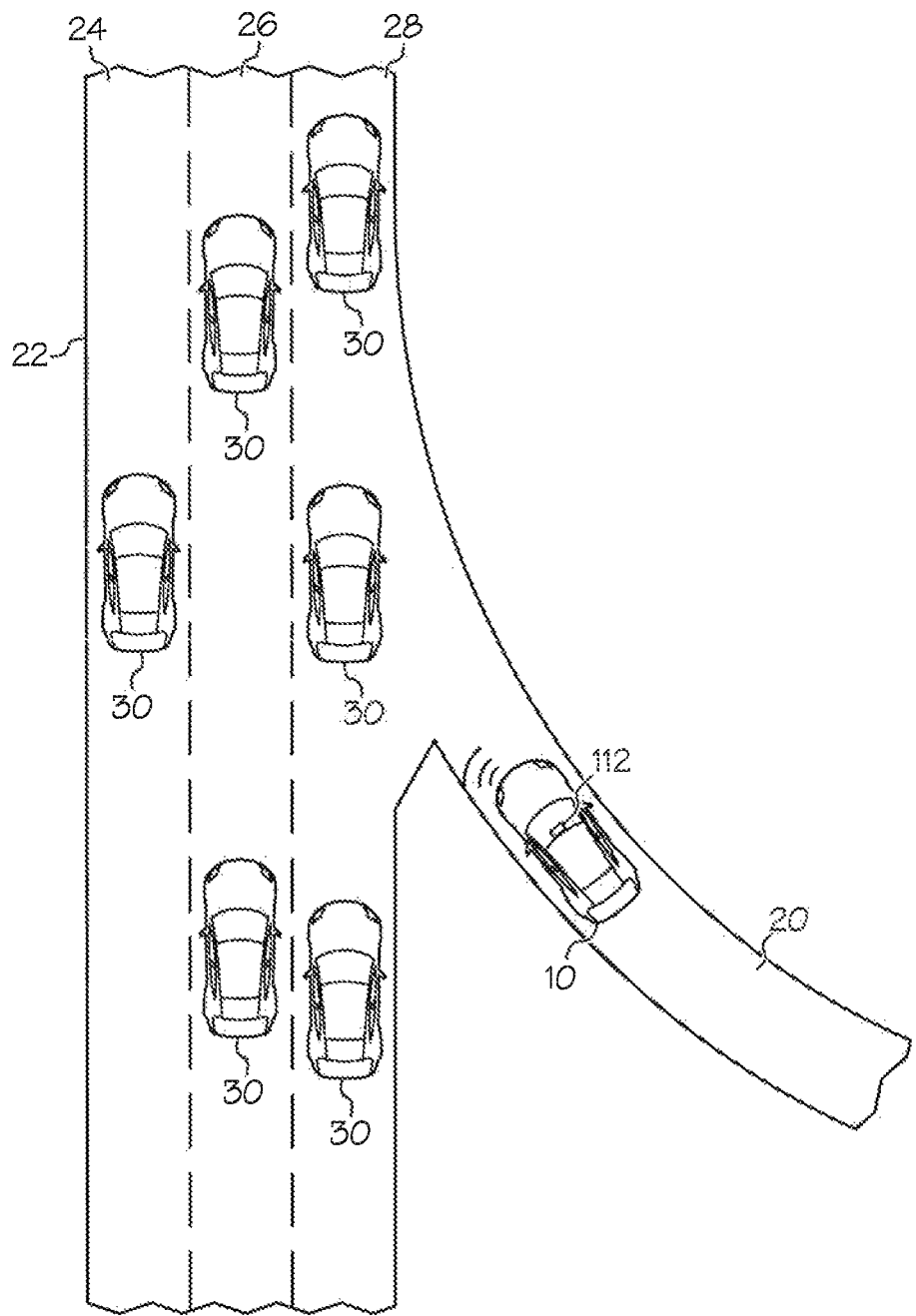
FIG. 7 depicts a first example scenario using the process depicted in FIG. 6, according to one or more embodiments shown and described herein.

Referring to FIG. 7, an example scenario in which data associated with a particular property may only be collected and/or processed if it is outside of a data band is depicted. The vehicle 10 is on an on-ramp 20 to a highway 22 with a left lane 24, a center lane 26, and a right lane 28. On the highway 22 there are multiple other vehicles 30. Each of the other vehicles 30 is driving along the highway 22. In scenarios such as a highway driving scenario, in which it is likely that most or all vehicles on the highway will be travelling at or near a certain speed, because of the high volume of traffic and relatively high speeds at which traffic progresses, it may be advantageous to only collect data relating to the speed or other characteristics of a vehicle if it is outside of a normal data band. For example, in highway entrance or driving scenarios it might be advantageous to track velocity data for vehicles that are traveling more than 5 mph below or 5 mph above a speed limit. In the particular embodiment shown in FIG. 7, the speed limit is 55 mph. Thus, it may be advantageous to only collect and/or process data for vehicles traveling less than 50 mph or greater than 60 mph.

Still referring to FIG. 7, as the vehicle approaches the right lane 28 from the on-ramp 20, the LIDAR system 112 may begin to detect the other vehicles 30 on the highway 22. Because there are a relatively high number of other vehicles 30, it may be processor-intensive to collect and/or process data on each of the other vehicles 30. The adaptive data collection and processing system may determine to only collect and/or process data for the other vehicles 30 that have a speed property above 60 mph or below 50 mph. Data that relates to the speed of the other vehicles 30 that are traveling above 50 mph but below 60 mph may be collected and/or processed only in so far as it is useful to alert the vehicle 10 that the other vehicle 30 is traveling at a speed within the expected data band.

Still referring to FIG. 7, in some instances, the data band may be related to a particular property of the vehicle 10. For example, the data band may be related to a speed of the vehicle 10, such that as the speed of the vehicle 10 increases, the anchor value of the data band increases. In the example embodiment shown in FIG. 7, the vehicle 10 may be accelerating as it approaches the right lane 28. The vehicle 10 may be increasing speed from 10 to 20 to 30 to 40 mph, etc. The data band may increase accordingly. For example, the vehicle 10 may collect and/or process data for other vehicles that are travelling between 5 and 15 mph, then 15 to 25 mph, then 25 to 35 mph, then 35 and 45 mph, etc. Collecting and/or processing only data that is within a data band may reduce the amount of data that is collected and/or processed by the vehicle 10 such that the vehicle 10 can collect and/or process all relevant data while not collecting and/or processing irrelevant data.

Figure 8:
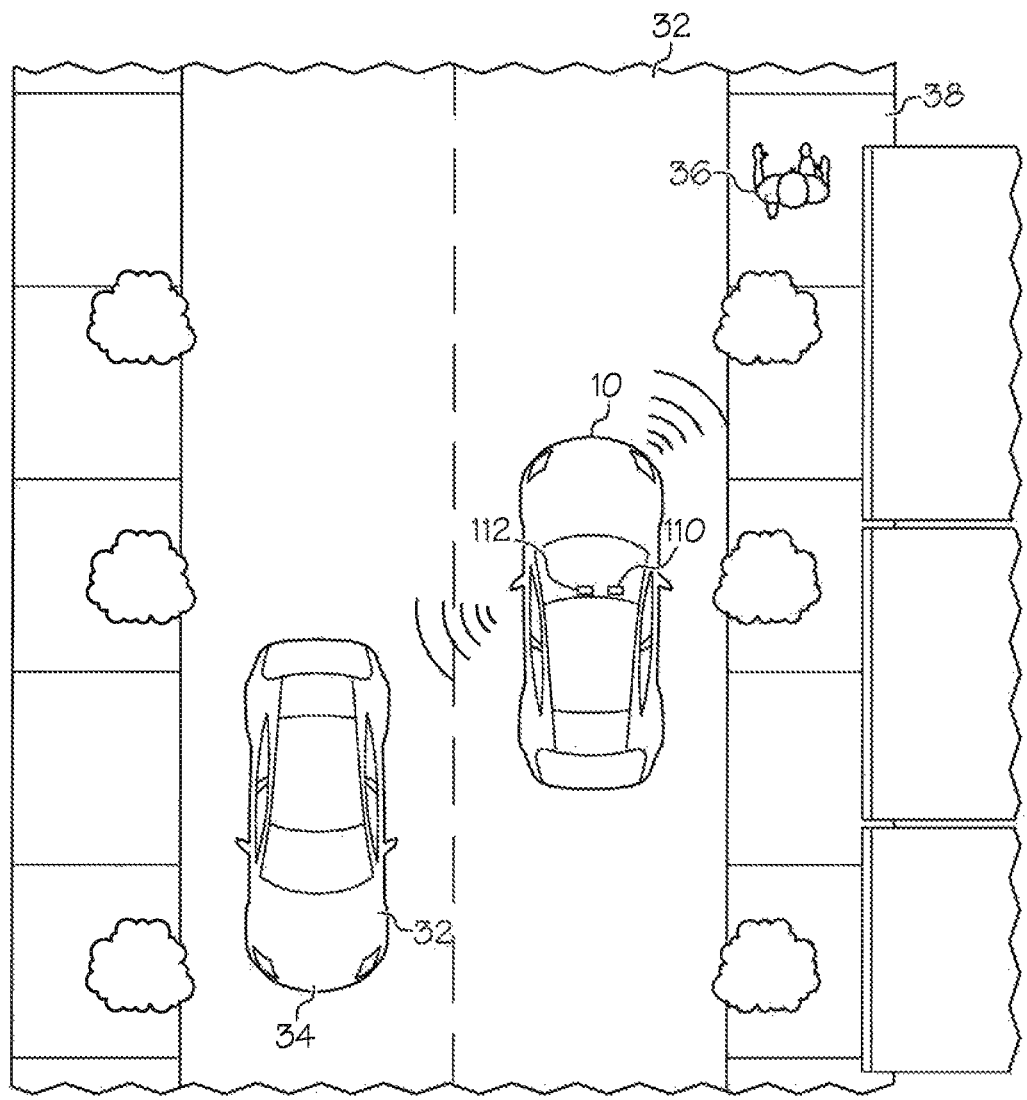
FIG. 8 depicts a second example scenario using the process depicted in FIG. 6, according to one or more embodiments shown and described herein.

Referring now to FIG. 8, an example scenario in which the frequency of data collection for a particular external object may be reduced is depicted. The vehicle 10 is shown driving along a road 32. The vehicle 10 shown in FIG. 8 passed a second vehicle 34 and is in the process of driving alongside a person 36 walking along a sidewalk 38. In the scenario shown, the vehicle 10 and the second vehicle 34 are driving in opposite directions, increasing the distance in between the two vehicles and the vehicle 10 and the person 36 are travelling in the same direction with the distance between the two decreasing. The vehicle 10 detects the second vehicle 34 and the person 36 with both the LIDAR system 112 and the at least one external environment camera 110 onboard the vehicle 10.

Under such circumstances, it may be advantageous for the vehicle 10 to reduce the amount of data collected and/or processed by the vehicle 10 associated with the second vehicle 34 for various reasons. For example, the second vehicle 34 is unlikely to be a collision threat and there may be multiple other external objects along the road 32 or otherwise in the surrounding environment that are more likely to affect the operation of the vehicle 10, for example, the person 36. Accordingly, the adaptive data collection and processing system 100 may determine to reduce the frequency of data collection and/or processing with respect to the second vehicle 34. As a non-limiting example, the adaptive data collection and processing system 100 may only collect and/or process data with respect to the second vehicle 34 once every other data cycle or once every tenth data cycle. Reducing the frequency of data collection and/or processing with respect to the second vehicle 34 may reduce the overall data collection and processing load on the adaptive data collection and processing system 100, thereby improving the performance of the adaptive data collection and processing system 100.

In some embodiments of the adaptive data collection and processing system 100, the various steps of the process 300 depicted in FIG. 6 may be performed in parallel with respect to any given external object. The steps of the process 300 may be carried out in accordance with the process 200 depicted in FIG. 3. For example, the determinations made at steps 308, 312, and 316 may be used to form the proper subset of data described in step 210.

Additionally, in some embodiments, the order of the steps of the process 300 may be dependent on a classification of the external object. For example, with reference to the scenario shown in FIG. 8, the adaptive data collection and processing system 100 may determine to replace a measured property with an estimated property before it determines to reduce the frequency of data collection if the external object is a human. As another example, the adaptive data collection and processing system 100 may determine to reduce a frequency of data collection before it determines to replace a measured property with an estimated property if the external object is a vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
one or more sensors configured to output data; and
an electronic control unit configured to:
receive first data from the one or more sensors at a first time;
detect an object based on the first data received from the one or more sensors at the first time;
classify the object into a classification based on the first data received from the one or more sensors at the first time;
receive second data from the one or more sensors at a second time, wherein the second time is subsequent to the first time;
select a proper subset of the second data for further processing based on the classification of the object;
estimate a property of the object based on the first data;
track the property of the object based on the proper subset of the second data selected for further processing; and
track the object based on the proper subset of the second data selected for further processing, thereby reducing an amount of data processed to track the object.

2. The vehicle of claim 1, wherein the property comprises at least one of a size, a direction of motion, and a speed of motion.

3. The vehicle of claim 1, wherein the electronic control unit is further configured to adjust a data collection frequency or a data collection volume based on the classification of the detected object.

4. The vehicle of claim 1, wherein the proper subset is selected based on a data band and data is in the proper subset only if it is outside the data band.

5. The vehicle of claim 4, wherein data that is not in the proper subset is replaced by an estimated value.

6. The vehicle of claim 1, wherein the proper subset comprises a data band and data is in the proper subset only if it is inside the data band.

7. An electronic control unit for a vehicle configured to:
receive first data from one or more sensors at a first time;
detect an object based on the first data received from the one or more sensors at the first time;
classify the object into a classification based on the first data received from the one or more sensors at the first time;
receive second data from the one or more sensors at a second time, wherein the second time is subsequent to the first time;
select a proper subset of the second data for further processing based on the classification of the object;
estimate a property of the object based on the first data;
track the property of the object based on the proper subset of the second data selected for further processing; and
track the object based on the proper subset of the second data selected for further processing, thereby reducing an amount of data processed to track the object.

8. The electronic control unit of claim 7, wherein the property comprises at least one of a size, a direction of motion, and a speed of motion.

9. The electronic control unit of claim 7 further configured to adjust a data collection frequency or a data collection volume based on the classification of the detected object.

10. The electronic control unit of claim 7, wherein the proper subset is selected based on a data band and data is in the proper subset only if it is outside the data band.

11. The electronic control unit of claim 10, wherein data that is not in the proper subset is replaced by an estimated value.

12. The electronic control unit of claim 7, wherein the proper subset comprises a data band and data is in the proper subset only if it is inside the data band.

13. A method of reducing an amount of data that must be processed by an electronic control unit of a vehicle, the method comprising:

receiving first data from one or more sensors communicatively coupled to the electronic control unit at a first time;

detecting an object based on the first data received from the one or more sensors at the first time;

classifying the object into a classification based on the first data received from the one or more sensors at the first time;

receiving second data from the one or more sensors at a second time, wherein the second time is subsequent to the first time;

selecting a proper subset of the second data for further processing based on the classification of the object;

estimating a property of the object based on the first data;

tracking the property of the object based on the proper subset of the second data selected for further processing; and tracking the object based on the proper subset of the second data selected for further processing, thereby reducing the amount of data processed to track the object.

14. The method of claim 13, wherein the property comprises at least one of a size, a direction of motion, and a speed of motion.

15. The method of claim 13, further comprising adjusting a data collection frequency or a data collection volume based on the classification of the detected object.

16. The method of claim 13, wherein the proper subset is selected based on a data band and data is in the proper subset only if it is outside the data band.

17. The method of claim 16, wherein data that is not in the proper subset is replaced by an estimated value.

\* \* \* \* \*